US008173085B2

(12) United States Patent
Ito et al.

(10) Patent No.: US 8,173,085 B2
(45) Date of Patent: May 8, 2012

(54) PROCESS FOR PRODUCING AN OXIDE

(75) Inventors: Kazuhiro Ito, Tokyo (JP); Satoru Watanabe, Tokyo (JP); Kazunari Watanabe, Tokyo (JP); Setsuro Ito, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/080,769

(22) Filed: Apr. 6, 2011

(65) Prior Publication Data

US 2011/0182803 A1 Jul. 28, 2011

Related U.S. Application Data

(63) Continuation of application No. PCT/JP2009/066642, filed on Sep. 25, 2009.

(30) Foreign Application Priority Data

Oct. 6, 2008 (JP) ................................ 2008-259781

(51) Int. Cl.
*C01F 7/00* (2006.01)

(52) U.S. Cl. ......... 423/111; 423/600; 423/625; 423/636

(58) Field of Classification Search .................. 423/111, 423/137, 600, 625, 636
See application file for complete search history.

(56) References Cited

U.S. PATENT DOCUMENTS

| | | | | |
|---|---|---|---|---|
| 7,670,585 B2* | 3/2010 | Hosono et al. | ................ | 423/600 |
| 7,722,846 B2* | 5/2010 | Hosono et al. | ................ | 423/263 |
| 2005/0053546 A1 | 3/2005 | Hosono et al. | | |
| 2006/0151311 A1 | 7/2006 | Hosono et al. | | |
| 2006/0276326 A1 | 12/2006 | Hosono et al. | | |
| 2008/0089826 A1 | 4/2008 | Hosono et al. | | |
| 2008/0095688 A1 | 4/2008 | Hosono et al. | | |

FOREIGN PATENT DOCUMENTS

| | | |
|---|---|---|
| JP | 2003-128415 | 5/2003 |
| WO | 2005/000741 | 1/2005 |
| WO | 2005/077859 | 8/2005 |
| WO | 2006/129674 | 12/2006 |
| WO | 2006/129675 | 12/2006 |

OTHER PUBLICATIONS

U.S. Appl. No. 13/034,765, filed Feb. 25, 2011, Ito et al.
International Search Report issued Dec. 15, 2009 in PCT/JP09/066642 filed Dec. 1, 2009.
F.M. Lea et al., The Chemistry of Cement and Concrete, 2nd ed. p. 52., Edward Arnold & Co., London, (1956) p. 49-55.
U.S. Appl. No. 13/192,568, filed Jul. 28, 2011, Ito et al.

* cited by examiner

*Primary Examiner* — Steven Bos
(74) *Attorney, Agent, or Firm* — Oblon, Spivak, McClelland, Maier & Neustadt, L.L.P.

(57) ABSTRACT

The present invention relates to a method for producing an oxide containing a conductive mayenite type compound and having an electron concentration of $1\times10^{18}/cm^3$ or more, from a raw material which is a combination of a calcium compound and an aluminum compound or is a compound containing calcium and aluminum, each having a molar ratio of calcium oxide and aluminum oxide ranging from 9:10 to 14:5 in terms of the oxides, the method including the steps of: heating and holding the raw material at 900 to 1,300° C. to produce a calcined powder containing at least one oxide selected from the group consisting of a calcium aluminate, calcium oxide and aluminum oxide; and heating and holding the calcined powder at 1,200° C. to less than 1,415° C. under a reduction atmosphere in an inert gas atmosphere or a vacuum atmosphere each having an oxygen partial pressure of 1,000 Pa or less.

6 Claims, No Drawings

PROCESS FOR PRODUCING AN OXIDE

TECHNICAL FIELD

The present invention relates to a method for producing an oxide containing a conductive mayenite type compound.

BACKGROUND ART

A mayenite type compound has a representative composition as $12CaO.7Al_2O_3$ (hereinafter described as "C12A7"), and has a characteristic crystal structure having three-dimensionally linked voids (cages) having a diameter of about 0.4 nm. A framework constituting the cages carries a positive electric charge and forms 12 cages per unit lattice. One sixth of the cages are occupied by oxygen ions in order to satisfy an electrically neutral condition of the crystal, and these oxygen ions are particularly called free oxygen ions because they have properties chemically different from those of the other oxygen ions constituting the framework. Accordingly, the C12A7 crystal is also denoted as $[Ca_{24}Al_{28}O_{64}]^{4+}.2O^{2-}$ (Non-Patent Document 1).

A C12A7 crystal powder or a sintered body thereof is allowed to contain electrons in the cages by conducting a heat treatment in a reduction atmosphere, thereby being able to impart permanent conductive properties at room temperature (Patent Document 1). The electrons contained are loosely bound to the cages and can move freely in the crystals, so that conductive properties can be imparted to the mayenite type compound.

However, conventionally, a crystal powder having only a C12A7 structure has first been produced by holding at 1,300° C. for 6 hours, and then, subjected to a reduction treatment, thereby obtaining a conductive mayenite type compound. Accordingly, expensive equipment, complicated control of reaction conditions and long-term reaction time have been required (Patent Document 2).

BACKGROUND ART DOCUMENT

Patent Documents

Patent Document 1: WO 2005/000741

Patent Document 2: WO 2006/129675 Pamphlet (US Patent Publication No. 2008-095688)

Non-Patent Documents

Non-Patent Document 1: F. M. Lea and C. H. Desch, The Chemistry of Cement and Concrete, 2nd ed., p. 52, Edward Arnold & Co., London, 1956

SUMMARY OF THE INVENTION

Problems that the Invention is to Solve

An object of the invention is to solve the above-mentioned problems of the conventional art. That is to say, in the conventional art, the crystal powder having only the C12A7 structure has been produced, and then, subjected to the reduction treatment, thereby producing only the conductive mayenite type compound, so that expensive equipment, complicated control of reaction conditions and long-term reaction time have been required.

Means for Solving the Problems

The present invention provides a method for producing an oxide containing a conductive mayenite type compound and having an electron concentration of $1\times10^{18}/cm^3$ or more, from a raw material which is a combination of a calcium compound and an aluminum compound or is a compound containing calcium and aluminum, each having a molar ratio of calcium oxide and aluminum oxide ranging from 9:10 to 14:5 in terms of the oxides, said method comprising the steps of:

heating and holding the raw material at 900 to 1,300° C. to produce a calcined powder containing at least one oxide selected from the group consisting of a calcium aluminate, calcium oxide and aluminum oxide; and heating and holding the calcined powder at 1,200° C. to less than 1,415° C. under a reduction atmosphere in an inert gas atmosphere or a vacuum atmosphere each having an oxygen partial pressure of 1,000 Pa or less.

Advantage of the Invention

According to the production method of the invention, an oxide containing a conductive mayenite type compound and having an electron concentration of $1\times10^{18}/cm^3$ or more can be produced efficiently in large amounts by a heat treatment for a short period of time without requiring expensive equipment, complicated control of reaction conditions and long-term reaction time.

Mode for Carrying Out the Invention

According to the production method of the invention, an oxide containing a conductive mayenite type compound and having an electron concentration of $1\times10^{18}/cm^3$ or more can be stably produced by heat treating a calcined powder in a reduction atmosphere without requiring a process requiring a long period of time and specialized treatment conditions which are difficult to be industrially realized.

In the invention, raw materials include a combination of a calcium compound and an aluminum compound or a compound containing calcium and aluminum.

Specifically, the above-mentioned raw materials are preferably the following (1) to (5). It is preferred that each mixture of the following (1) to (4) is homogeneously mixed, and an automatic mortar, a ball mill or the like is used for mixing.

(1) A mixture of a calcium compound and an aluminum compound;

(2) A mixture of a calcium compound and a calcium aluminate;

(3) A mixture of an aluminum compound and a calcium aluminate;

(4) A mixture of a calcium compound, an aluminum compound and a calcium aluminate; and (5) A calcium aluminate.

The calcium compound used in the above-mentioned raw material may be any compound, as long as it is a compound which can produce a calcined powder containing at least one of a calcium aluminate and calcium oxide by heating and holding the mixture of the above (1), (2) or (4) at 900 to 1,300° C. Specific examples thereof include calcium carbonate, calcium oxide, calcium hydroxide, calcium hydrogen carbonate, calcium sulfate, calcium metaphosphate, calcium oxalate, calcium acetate, calcium nitrate, calcium halides and the like.

Of these calcium compounds, the calcium compound containing at least one selected from the group consisting of calcium carbonate, calcium oxide and calcium hydroxide is preferably used in the above-mentioned raw material.

The aluminum compound used in the above-mentioned raw material may be any compound, as long as it is a compound which can produce a calcined powder containing at least one of a calcium aluminate and aluminum oxide by heating and holding the mixture of the above (1), (3) or (4) at 900 to 1,300° C. Specific examples thereof include aluminum hydroxide, aluminum oxide, aluminum sulfate, aluminum nitrate, aluminum halides and the like. Of these aluminum compounds, the aluminum compound containing at least one of aluminum hydroxide and aluminum oxide is preferably used in the above-mentioned raw material.

The above-mentioned calcium aluminate (5) used in the above-mentioned raw material is a compound in which calcium oxide and aluminum oxide are contained at a constant rate, and specifically, a compound containing calcium and aluminum, such as C12A7, $3CaO.Al_2O_3$ (hereinafter described as C3A), $CaO.Al_2O_3$ (hereinafter described as CA) or $5CaO.3Al_2O_3$ (hereinafter described as C5A3) and so on.

In the invention, the mayenite type compound means crystals of $12CaO.7Al_2O_3$. The mayenite type compound in the invention may be a compound in which a part or all of free oxygen ions in cages are replaced by other anions within the range where a framework of a C12A7 crystal lattice and a cage structure formed by the framework are retained. The other anions include, for example, $H^-$, $H^{2-}$, $OH^-$, $F^-$, $Cl^-$, $S^{2-}$ and the like. Incidentally, C12A7 is transcribed by $Ca_{12}Al_{14}O_{33}$ or $Ca_{24}Al_{28}O_{66}$ in some cases. In the mayenite type compound, oxygen in the cages is replaced by electrons by a treatment of some kind to form a conductive mayenite type compound.

The electron concentration of the oxide in the invention is $1\times10^{18}/cm^3$ or more, because when the electron concentration of the oxide is $1\times10^{18}/cm^3$ or more, electron emission characteristics are improved, for example, the secondary electron emission coefficient increases. The oxide of the invention contains the conductive mayenite type compound in which at least a part of the free oxygen ions in the cages of the mayenite type compound are replaced by the electrons. The electron concentration of the above-mentioned oxide can be adjusted to $1\times10^{18}/cm^3$ or more by containing the conductive mayenite type compound. The above-mentioned oxide may contain the calcium aluminate such as C3A or CA, in addition to C12A7.

The electrical conductivity of the conductive mayenite type compound in the invention is 0.1 S/cm, when the electron concentration is $1\times10^{18}/cm^3$. Accordingly, it is 0.1 S/cm or more, and preferably 1.0 S/cm or more. As the maximum value of the electrical conductivity, about 1,000 S/cm is possible in a single crystal.

From the viewpoint of the secondary electron emission coefficient, the electron concentration of the oxide of the invention is preferably $1\times10^{19}/cm^3$ or more. The oxide in the invention is more preferably a single phase of the C12A7 crystals which can impart conductive properties. The reason for this is that the single phase of the C12A7 crystals makes it easy to obtain the oxide having a high electron concentration, which can increase the secondary electron emission coefficient. In particular, in the case of the single phase of C12A7 in which all of the free oxygen ions are replaced by the electrons, the electron concentration preferably becomes $2.3\times10^{21}/cm^3$.

The amount of the conductive mayenite type compound contained in the above-mentioned oxide may be any, as long as the oxide contains the conductive mayenite type compound in such an amount that the electron concentration of the above-mentioned oxide becomes $1\times10^{18}/cm^3$ or more. For example, when the above-mentioned oxide contains the conductive mayenite type compound having an electron concentration of $1\times10^{20}/cm^3$, it is sufficient that the conductive mayenite type compound is contained in the above-mentioned oxide in an amount of 1% by volume or more, because when the above-mentioned conductive mayenite type compound is contained in an amount of 1% by volume or more, the electron concentration of the above-mentioned oxide becomes $1\times10^{18}/cm^3$ or more. Further, it is preferred that the conductive mayenite type compound is contained in the above-mentioned oxide in an amount of 30% by volume or more, particularly 50% by volume or more.

In the invention, the above-mentioned raw material is heated and held at 900 to 1,300° C. to produce the calcined powder. When the above-mentioned raw material is heated and held at 900 to 1,300° C., sintering due to a solid-phase reaction proceeds. Accordingly, an intermediate reaction product generated in the course of the production becomes any one of a state where the powder is aggregated, a bulk form and a mixture of the both. For this reason, this aggregated powder is loosened, namely cracked, or the sintered bulk is crushed, namely pulverized, thereby being able to produce the calcined powder. Methods used for this cracking or pulverization include an automatic mortar, a ball mill and the like. When the average particle size of the sintered reaction product is about 5 mm or less, the cracking or pulverization can be easily performed by using the automatic mortar, and the calcined powder can be easily obtained. It is therefore preferred that the average particle size of the intermediate reaction product is about 5 mm or less. It is sufficient that the average particle size of the resulting calcined powder is from 5 to 100 μm.

In the production method of the oxide of the invention, before the calcined powder is heated and held at 1,200 to less than 1,415° C. (hereinafter referred to as main firing), it may be more finely pulverized. As a method used for this pulverization, there can be used a circulation type bead mill or the like. Homogeneity of the calcined powder is enhanced by more finely pulverizing the calcined powder, which allows the solid-phase reaction to easily proceed in the main firing. The average particle size of the calcined powder thus finely pulverized is preferably from 0.5 to 50 μm. When the average particle size of the calcined powder finely pulverized is less than 0.5 μm, aggregation is liable to occur, resulting in a difficulty in handling. Further, when it exceeds 50 μm, the solid-phase reaction becomes difficult to proceed when the main firing is performed. There is therefore a possibility that it requires a long period of time to produce the mayenite type compound. The average particle size of the above-mentioned finely pulverized calcined powder is a value measured by using a laser diffraction scattering method.

As compositions of the calcined powders, there are specifically exemplified the following mixtures of (1) to (3), but are not limited thereto.

(1) A mixture containing a calcium aluminate containing at least one of C3A and CA, and at least one of calcium oxide and aluminum oxide;

(2) A mixture of calcium oxide and aluminum oxide; and (3) A mixture of a calcium aluminate containing at least one of C3A and CA and a calcium aluminate having another composition.

Crystals having a molar ratio different from that of C3A or CA may be mixed in the calcium aluminate.

In the invention, when the calcined powder is produced by using the raw material containing calcium carbonate, carbon dioxide gas generated from calcium carbonate remains at a heating temperature of less than 900° C. to cause a difficulty in allowing the solid-phase reaction of calcium oxide and aluminum oxide to proceed. There is therefore a possibility that the homogeneity of the calcined powder is deteriorated. Further, when the temperature is rapidly raised to the heat treatment temperature of the main firing in a state where calcium carbonate remains, carbon dioxide gas is rapidly released to cause a possibility that an inner wall of a carbon crucible is significantly damaged. The carbon crucible damaged is decreased in the number of usable cycles thereof, so that the exchange frequency thereof increases to cause a possibility that the oxide of the invention cannot be efficiently produced.

Further, in order to prevent carbon dioxide gas from being rapidly released, the temperature region in which carbon dioxide gas is released from calcium carbonate is gradually raised, thereby being able to prevent the damage of the carbon crucible. However, the time of the main firing becomes long, so that there is a possibility of failing to efficiently produce the oxide. When the heating temperature exceeds 1,300° C., sintering of a sintered body proceeds. Accordingly, the sintered body becomes extremely hard to cause poor pulverizability, so that it requires a long period of time for pulverization, resulting in a failure to efficiently produce the oxide. It is therefore preferred that the heating temperature is from 950 to 1,250° C., when the calcined powder is produced by using the raw material containing calcium carbonate.

The time for which the above-mentioned raw material is heated and held at 900 to 1,300° C. is not particularly limited. However, it is preferably from 1 to 6 hours, because homogeneity is maintained and high productivity is secured. When the time is less than 1 hour, the solid-phase reaction does not sufficiently proceed, resulting in poor homogeneity, and when it exceeds 6 hours, the solid-phase reaction sufficiently proceeds, which is unfavorable in view of productivity. It is preferably from 1 to 4 hours, and more preferably from 1.5 to 3 hours.

The raw material of the invention contains a combination of the calcium compound and the aluminum compound or the compound containing calcium and aluminum at a molar ratio of calcium oxide and aluminum oxide of 9:10 to 14:5 in terms of the oxides.

When the above-mentioned molar ratio is less than 9:10 or exceeds 14:5, the amount of the mayenite type compound formed is extremely small, although the mayenite type compound can be formed from the above-mentioned raw material. Accordingly, there is a possibility that the electron concentration of the oxide of the invention becomes less than $1\times10^{18}/cm^3$, so that this is unfavorable. The molar ratio of calcium oxide and aluminum oxide in terms of the oxides is preferably from 11:8 to 13:6, and particularly preferably from 11.8:7.2 to 12.2:6.8.

In the invention, the calcined powder is subjected to the main firing under a reduction atmosphere in an inert gas atmosphere or a vacuum atmosphere each having an oxygen partial pressure of 1,000 Pa or less. In the main firing, at least a part of the oxide of the calcined powder becomes the mayenite type compound, and because the heat treatment is conducted under the reduction atmosphere, free oxygen in the cages of the mayenite type compound is replaced by electrons to obtain the oxide containing the conductive mayenite type compound.

The main firing under the reduction atmosphere is performed, using a closed system electric furnace, allowing a gas unreactive to the above-mentioned raw material, such as nitrogen in which the partial pressures of oxygen and water vapor are reduced, to flow in the atmosphere, and decreasing the oxygen partial pressure to 10 Pa or less.

When the oxygen partial pressure in the main firing exceeds 1,000 Pa, the conductive mayenite type compound entraps oxygen in the atmosphere under high temperature, and a reaction of replacing the electrons in the cages by the free oxygen ions proceeds. Thus, the conductive properties of the resulting mayenite type compound are deteriorated. The oxygen partial pressure is preferably 10 Pa or less, and more preferably $10^{-1}$ Pa or less.

Further, even when the oxygen partial pressure in the main firing is decreased to less than $10^{-11}$ Pa, the heat treatment cost runs up, whereas the electrical conductivity of the resulting conductive mayenite type compound is not improved. Accordingly, the oxygen partial pressure is preferably $10^{11}$ Pa or more.

As methods for adjusting the oxygen partial pressure to 1,000 Pa or less, there are preferably exemplified atmospheres of various oxygen gas-free inert gases, for example, nitrogen gas and rare gases such as argon, vacuum and the like. When an easily nitridable component such as aluminum is contained in the above-mentioned calcined powder as a reducing agent, the use of nitrogen gas as the inert gas causes a possibility that the desired conductive mayenite type compound is not obtained from the above-mentioned calcined powder by nitriding of the reducing agent. In that case, the main firing is preferably performed in the atmosphere of the rare gas such as argon or in vacuum.

In order to heat treat the calcined powder in the reduction atmosphere, the reduction atmosphere is preferably formed by at least one of hermetically sealing the carbon crucible in which the calcined powder has been placed and using the reducing agent. When the reducing agent is used, it is preferred that a powder of the reducing agent is allowed to be contained in the calcined powder to form a reducing agent-containing calcined powder, thereby performing the main firing. Incidentally, the reducing agent is preferably a carbon material, and it is preferred that the main firing is performed, after a calcined powder in which the carbon material as the reducing agent is allowed to be contained (a carbon material powder-containing calcined powder) has been prepared. Further, when the calcined powder is placed in the carbon crucible and the crucible is hermetically sealed, a carbon cover is preferably used for hermetical sealing, because the reduction atmosphere is easily formed when the crucible is hermetically sealed with the carbon cover.

When this heat treatment is conducted, a double carbon crucible may be used which has a structure that a carbon crucible with a cover is further placed in a carbon crucible with a cover. The use of the double carbon crucible decreases the oxygen partial pressure in the crucible, so that it can be preferably used.

In the case of the calcined powder containing no carbon material as the reducing agent, a contact portion with the carbon crucible is liable to be reduced, and in the case of the carbon material powder-containing calcined powder, a contact portion with the carbon material powder is liable to be reduced. In either case, oxygen in the cages is replaced by electrons from a periphery of carbon or the carbon material in contact, and the mayenite type compound becomes the conductive mayenite type compound.

The time of the main firing varies depending on the size of the carbon crucible and the amount of the calcined powder. For example, when the size of the carbon crucible is 50 mm in inner diameter and 50 mm in depth, in the case where the amount of the calcined powder is 3 g, the calcined powder can be converted to the conductive mayenite type compound within approximately 3 hours. Further, in the case where the amount of the carbon material powder-containing calcined powder is 3 g, the carbon material powder-containing calcined powder can be converted to the conductive mayenite type compound in approximately 2 hours.

The electrons in the cages can be increased in a short period of time by allowing the carbon material in the carbon material powder-containing calcined powder to be homogeneously contained in the calcined powder in a powder state, because the reduction atmosphere is more enhanced. This has an effect of increasing the electron concentration to increase the conductive properties, so that this is preferred. Further, carbon in the powder state also has an effect of inhibiting sintering, and the whole calcined powder is homogeneously reduced. Accordingly, the use of the carbon material powder-containing calcined powder is a method suitable for producing the oxide containing the conductive mayenite type compound, in large amounts and efficiently. This is therefore preferred.

The above-mentioned carbon material powder-containing calcined powder is obtained by mixing the above-mentioned calcined powder and the powdery carbon material. When the above-mentioned calcined powder and the powdery carbon material are mixed, they may be mixed by a wet process. Even when mixed by a dry process which is said to be generally difficult to perform homogeneous mixing, the sintering inhibiting effect and the reduction effect can be sufficiently obtained.

As the carbon material, there is used at least one selected from the group consisting of a carbon allotrope, an acetylide compound, a covalently-bound or ionic metal carbide and a hydrocarbon compound. As the carbon allotropes, there can be used carbon allotropes such as amorphous carbon, graphite, diamond, fullerene and carbon nanotube. As the carbides, there can be used various metal carbides, acetylide compounds and hydrocarbon compounds.

The metal carbide is a compound of carbon and a metal, and specific examples thereof include calcium carbide. The acetylide compound is a generic name of a carbide in which one or both hydrogen atoms of acetylene are replaced by metal atoms, and the above-mentioned metal carbides are one kind thereof. The hydrocarbon compound is a generic name of a compound composed of carbon and hydrogen.

The content of the carbon material powder in the above-mentioned carbon material powder-containing calcined powder is preferably from 0.1 to 1.0 part by mass based on 100 parts by mass of the calcined powder. Less than 0.1 part by mass results in the insufficient sintering inhibiting effect, whereas exceeding 1.0 part by mass results in a difficulty in synthesizing mayenite type crystals to increase the calcium aluminate, although the sintering inhibiting effect is obtained. There is therefore a possibility that the electron concentration of the oxide does not sufficiently increase.

When the temperature of the main firing in which the above-mentioned calcined powder or the above-mentioned carbon material powder-containing calcined powder is heat treated in the reduction atmosphere is less than 1,200° C., the mayenite type compound is not sufficiently reduced by carbon or the carbon material. Accordingly, the conductive mayenite type compound cannot be sufficiently produced. For this reason, the oxide having an electron concentration of $1\times10^{18}/cm^3$ or more cannot be effectively obtained.

When the temperature of the main firing is within the range of 1,200 to 1,270° C., the amount of the mayenite type compound produced is less than 30% by volume in the oxide, and the calcium aluminate mainly containing CA is deposited. Further, within the temperature range of 1,200 to 1,270° C., the reduction effect due to the carbon crucible and/or the carbon material is not sufficiently obtained, and the electron concentration of the mayenite type compound becomes about 1 to $5\times10^{18}/cm^3$. When the temperature of the main firing is within the range of 1,200 to 1,270° C., it is difficult to obtain the oxide having an electron concentration of $1\times10^{19}/cm^3$ or more.

When the oxide is the single phase of the C12A7 crystals which can impart conductive properties, the oxide having an electron concentration of $1\times10^{18}/cm^3$ or more is liable to be obtained. Accordingly, in order to obtain the single phase of the C12A7 crystals, it is preferred to perform the main firing at 1,270° C. or more. Exceeding 1,415° C. results in exceeding 1,415° C. as the melting point of the mayenite type compound to break the C12A7 crystals. This is therefore unfavorable. For this reason, it is more preferred to perform heating and holding at 1,400° C. or less.

When all of the free oxygen ions in the cages of the C12A7 crystals are replaced by the electrons, the melting point drops about 100° C. Accordingly, in order to obtain the oxide having a high electron concentration, it is particularly preferred to perform the main firing at 1,300 to 1,350° C.

The rate of temperature increase in the main firing is preferably 50° C./hour or more, and more preferably 200° C./hour or more. When the rate of temperature increase is less than 50° C./hour, it requires a long period of time for the heat treatment, resulting in a decrease in productivity.

The cooling rate after the main firing is preferably 50° C./hour or more. When the cooling rate is less than 50° C./hour, the productivity decreases because it requires a long period of time for the heat treatment. Further, in vacuum, the electrons in the cages of the conductive mayenite type compound are sometimes released in the course of cooling. When the cooling rate is less than 50° C./hour, there is a possibility that the conductive properties of the oxide are deteriorated. This is therefore unfavorable. For this reason, the cooling rate is more preferably from 200 to 500° C./hour. As a cooling method after the main firing, cooling may be performed in an atmosphere of an inert gas such as nitrogen, or air cooling may be performed. However, it is preferred to perform rapid cooling at a cooling rate of 200 to 500° C./hour by using a heat treatment furnace equipped with a cooling installation such as water cooling.

As described above, the use of the production method of the invention makes it possible to produce the oxide containing the conductive mayenite type compound and having an electron concentration of $1\times10^{18}/cm^3$ or more, in large amounts and efficiently.

EXAMPLES

The invention will be specifically described below with reference to Examples, but the invention is not limited to the following description. Examples 1 to 9 are working examples, and Examples 10 to 15 are comparative examples.

[Example 1]

After 62.7 g of calcium carbonate and 37.3 g of aluminum oxide were mixed to a molar ratio of calcium oxide and aluminum oxide of 12:7 in terms of the oxides, the temperature was raised to 1,100° C. at a rate of temperature increase of 300° C./hour in air and held for 2 hours. The temperature was lowered to room temperature at a cooling rate of 300° C./hour. As a result, sintering due to a solid-phase reaction scarcely proceeded, and 72 g of an aggregated powder was obtained.

The average particle size of the aggregated powder was 100 μm or less, and cracking could be easily performed by using an automatic mortar to obtain a calcined powder. The resulting calcined powder was examined by using X-ray diffraction. As a result, it was a mixture of an calcium aluminate, calcium oxide and aluminum oxide. The average particle size of the calcined powder was measured by a laser diffraction scattering method (SALD-2100, manufactured by Shimadzu Corporation). As a result, the average particle size was 20 μm.

Three grams of the resulting calcined powder was placed in a carbon crucible having an outer diameter of 50 mm, an inner diameter of 40 mm and a height of 50 mm, and the crucible was closed with a carbon cover. The temperature was rapidly raised to 1,300° C. in a vacuum atmosphere having an oxygen partial pressure of $10^{-3}$ Pa, followed by holding at 1,300° C. for 2 hours, and then, cooled to room temperature at a cooling rate of 300° C./hour. After the heat treatment, 2.9 g of an oxide was obtained. The resulting oxide showed dark green, and X-ray diffraction revealed that it had only a C12A7 structure. Further, the electron concentration of the oxide determined from a light diffuse reflection spectrum by the Kubelka-Munk method was $1.0\times10^{20}$/cm$^3$, and the electrical conductivity thereof was 8.8 S/cm. This revealed that the oxide was a conductive mayenite type compound.

[Example 2]

An oxide was produced in the same manner as in Example 1 with the exception that the calcined powder was held at 1,250° C. for 2 hours. This oxide was a C12A7 single phase. The electron concentration of this oxide was $5.0\times10^{18}$/cm$^3$, and the electrical conductivity thereof was 0.2 S/cm.

[Example 3]

An oxide was produced in the same manner as in Example 1 with the exception that the calcined powder was held at 1,400° C. for 2 hours. This oxide was a C12A7 single phase. The electron concentration of this oxide was $6\times10^{19}$/cm$^3$, and the electrical conductivity thereof was 5.3 S/cm.

[Example 4]

An oxide was produced in the same manner as in Example 1 with the exception that the temperature was raised to 1,000° C. in air and held for 2 hours to produce a calcined powder. This oxide was a C12A7 single phase. The electron concentration of this oxide was $1.9\times10^{20}$/cm$^3$, and the electrical conductivity thereof was 16.7 S/cm.

[Example 5]

An oxide was produced in the same manner as in Example 1 with the exception that there was used a carbon material powder-containing calcined powder obtained by mixing a graphite carbon material powder with the calcined powder in an amount of 0.1 part by mass based on 100 parts by mass of the calcined powder. This oxide was a C12A7 single phase. The electron concentration of this oxide was $1.3\times10^{19}$/cm$^3$, and the electrical conductivity thereof was 11.4 S/cm.

[Example 6]

An oxide was produced in the same manner as in Example 1 with the exception that there was used a carbon material powder-containing calcined powder obtained by mixing a graphite carbon material powder with the calcined powder in an amount of 1.0 part by mass based on 100 parts by mass of the calcined powder. This oxide was a C12A7 single phase. The electron concentration of this oxide was $2.1\times10^{19}$/cm$^3$, and the electrical conductivity thereof was 18.5 S/cm.

[Example 7]

After 52.2 g of calcium carbonate and 47.8 g of aluminum oxide were mixed to a molar ratio of calcium oxide and aluminum oxide of 10:9 in terms of the oxides, the temperature was raised to 1,100° C. at a rate of temperature increase of 300° C./hour in air and held for 2 hours. The temperature was lowered to room temperature at a cooling rate of 300° C./hour. As a result, sintering due to a solid-phase reaction scarcely proceeded, and 77 g of an aggregated powder was obtained. The average particle size of the aggregated powder was 100 μm or less, and cracking could be easily performed by using an automatic mortar to obtain a calcined powder. The resulting calcined powder was examined by using X-ray diffraction. As a result, it was a mixture of a calcium aluminate, calcium oxide and aluminum oxide. The average particle size of the calcined powder was measured by a laser diffraction scattering method (SALD-2100, manufactured by Shimadzu Corporation). As a result, the average particle size was 20 μm.

Three grams of the resulting calcined powder was placed in a carbon crucible having an outer diameter of 50 mm, an inner diameter of 40 mm and a height of 50 mm, and the crucible was closed with a carbon cover. The temperature was raised to 1,350° C. at a rate of temperature increase of 300° C./hour in a nitrogen atmosphere having an oxygen partial pressure of 0.06 Pa, followed by holding at 1,350° C. for 2 hours, and then, cooled to room temperature at a cooling rate of 300° C./hour. Thus, 2.9 g of an oxide was obtained. Deposited crystals of the resulting oxide were mainly CA, but C12A7 was also contained. The electron concentration of this oxide was $3.0\times10^{18}$/cm$^3$, and the electrical conductivity thereof was 0.1 S/cm.

[Example 8]

An oxide was produced in the same manner as in Example 7 with the exception that a calcined powder was produced by mixing calcium carbonate and aluminum oxide to a molar ratio of calcium oxide and aluminum oxide of 13.5:5.5 in terms of the oxides. Deposited crystals of the oxide were mainly C3A, but C12A7 was also contained. The electron concentration of this oxide was $1.2\times10^{18}$/cm$^3$, and the electrical conductivity thereof was 0.1 S/cm.

[Example 9]

Cement clinker was used as a starting raw material. The cement clinker is one obtained by raising the temperature to about 1,500° C. to burn cement raw materials such as limestone, clay, siliceous raw materials and iron oxide, followed by rapid cooling, and is lumps of about 5 to 10 cm. Accordingly, the cement clinker can be said to be a compound containing calcium and aluminum. The ratio of calcium and aluminum of the above-mentioned cement clinker was 12.3:6.7 in terms of the oxides.

An oxide was produced in the same manner as in Example 1 with the exception that a cement clinker powder obtained by pulverizing the above-mentioned cement clinker to a powder was used. Deposited crystals in the oxide were mainly C12A7, but different phases such as silicate compounds were also contained. The electron concentration of this oxide was $6.0\times10^{18}$/cm$^3$, and the electrical conductivity thereof was 0.5 S/cm.

[Example 10]

An oxide was produced in the same manner as in Example 1 with the exception that the calcined powder was held at 1,150° C. for 2 hours. This oxide was a C12A7 single phase, but the electron concentration of this oxide was $1.0\times10^{14}$/cm$^3$ and the electrical conductivity thereof was $4.0\times10^{-4}$ S/cm.

[Example 11]

An oxide was produced in the same manner as in Example 1 with the exception that the temperature was raised to 1,450° C. at 300° C./hour to heat the calcined powder, followed by holding for 2 hours, and cooled to room temperature at 300° C./hour. Deposited crystals in the oxide were mainly C12A7, but C3A and CA were also contained. The electron concentration was $1.0\times10^{19}$/cm$^3$, and the electrical conductivity was 0.4 S/cm.

The heat treatment temperature of the calcined powder exceeded the melting point of the mayenite type compound, so that the calcined powder was melted. The calcined powder melted was fused to the carbon crucible, and the sintered body could not be collected without breaking the crucible. Further, the sintered body was extremely hardened, and it was necessary to use a stamp mill for pulverization. This was therefore lacking in productivity.

[Example 12]

An oxide containing a conductive mayenite type compound was produced in the same manner as in Example 7 with the exception that a calcined powder was produced by mixing calcium carbonate and aluminum oxide to a molar ratio of calcium oxide and aluminum oxide of 8:11 in terms of the oxides. Deposited crystals in the oxide were mainly CA and C3A, and C12A7 was little present. The electron concentration was $5.0\times10^{17}/cm^3$, and the electrical conductivity was unmeasurable.

[Example 13]

An oxide containing a conductive mayenite type compound was produced in the same manner as in Example 7 with the exception that calcium carbonate and aluminum oxide were mixed to a molar ratio of calcium oxide and aluminum oxide of 14.5:4.5 in terms of the oxides. Deposited crystals in the oxide were mainly C3A and CA, and C12A7 was little present. The electron concentration was $1.0\times10^{17}/cm^3$, and the electrical conductivity was $1.6\times10^{-3}$ S/cm.

[Example 14]

After calcium carbonate and aluminum oxide were mixed to a molar ratio of calcium oxide and aluminum oxide of 12:7 in terms of the oxides, the temperature was raised to 1,350° C. at a rate of temperature increase of 300° C./hour in air and held for 6 hours. The temperature was lowered to room temperature at a cooling rate of 300° C./hour to obtain a sintered body.

According to the heat treatment at 1,350° C. for 6 hours, sintering of the raw materials significantly proceeded, and the resulting sintered body was all converted to a bulk reaction product. It was difficult to directly pulverize this bulk reaction product with an automatic mortar, so that the bulk reaction product was crushed with a stamp mill to an average particle size of about 5 mm, and thereafter, finely pulverized by using the automatic mortar. In this production method, the process for pulverizing the resulting bulk reaction product became complicated, and it required a long period of time. This was therefore not adequate to mass production.

[Example 15]

After calcium carbonate and aluminum oxide were mixed to a molar ratio of calcium oxide and aluminum oxide of 12:7 in terms of the oxides, the temperature was raised to 850° C. at a rate of temperature increase of 300° C./hour in air and held for 2 hours. The temperature was lowered to room temperature at a cooling rate of 300° C./hour to obtain a powder, which was cracked by using an automatic mortar to obtain a calcined powder. The resulting calcined powder was examined by using X-ray diffraction. As a result, it was mainly in a mixed state of calcium carbonate and aluminum oxide.

Three grams of the calcined powder was placed in a carbon crucible having an outer diameter of 50 mm, an inner diameter of 40 mm and a height of 50 mm, and the crucible was closed with a carbon cover. The temperature was rapidly raised to 1,300° C. in a nitrogen atmosphere having an oxygen partial pressure of 0.06 Pa, followed by holding at 1,300° C. for 2 hours, and then, rapidly cooled to room temperature. Release of carbon dioxide gas from calcium carbonate rapidly occurred at 898° C., so that an inner wall of the carbon crucible was significantly damaged. The number of use of the carbon crucible extremely decreased, resulting in a failure to efficiently produce a large amount of the oxide.

While the invention has been described in detail and with reference to specific embodiments thereof, it will be apparent to one skilled in the art that various changes and modifications can be made therein without departing from the spirit and scope of the invention.

The invention is based on Japanese Patent Application No. 2008-259781 filed on Oct. 6, 2008, the contents of which are incorporated herein by reference.

Industrial Applicability

According to the production method of the invention, an oxide containing conductive mayenite having high conductive properties can be produced stably at low cost in large amounts. The oxide produced by the method of the invention has excellent electron emission characteristics, so that it can be used as a field effect type electron emission material. Accordingly, an electron emission device, a display device or a small-sized X-ray source is realized. Further, since the work function thereof is small, it can also be used as an electrode material required to have a particular junction property, such as a charge-injection material in organic EL devices.

The invention claimed is:

1. A method for producing an oxide containing a conductive mayenite compound and having an electron concentration of $1\times10^{18}/cm^3$ or more, from a raw material which is a combination of a calcium compound and an aluminum compound or is a compound containing calcium and aluminum, each having a molar ratio of calcium oxide and aluminum oxide ranging from 9:10 to 14:5 in terms of the oxides, said method comprising the steps of:

heating and holding the raw material at 900 to 1,250° C. to produce a calcined powder containing at least one oxide selected from the group consisting of a calcium aluminate, calcium oxide and aluminum oxide; and heating and holding the calcined powder at 1,270° C. to less than 1,415° C. under reducing conditions in an inert gas atmosphere or a vacuum each having an oxygen partial pressure of 1,000 Pa or less.

2. The method for producing an oxide according to claim 1, wherein the calcium compound comprises at least one selected from the group consisting of calcium carbonate, calcium oxide and calcium hydroxide, and the aluminum compound comprises at least one member selected from the group consisting of aluminum hydroxide and aluminum oxide.

3. The method for producing an oxide according to claim 1, wherein the reducing conditions are formed by at least one member selected from the group consisting of hermetically sealing a carbon crucible in which the calcined powder has been placed and a reducing agent.

4. The method for producing an oxide according to claim 3, wherein the reducing agent is a carbon material.

5. The method for producing an oxide according to claim 4, wherein the carbon material is at least one selected from the group consisting of a carbon allotrope, an acetylide compound, a covalently-bound metal carbide, an ionic metal carbide and a hydrocarbon compound.

6. The method for producing an oxide according to claim 1, wherein the electron concentration of the oxide is $1\times10^{19}/cm^3$ or more.

* * * * *